(12) United States Patent  
Richards et al.

(10) Patent No.: US 10,761,314 B1  
(45) Date of Patent: Sep. 1, 2020

(54) APPARATUSES, SYSTEMS, AND METHODS FOR REFLECTING INFRARED LIGHT

(71) Applicant: Facebook Technologies, LLC, Menlo Park, CA (US)

(72) Inventors: Evan M. Richards, Fremont, CA (US); Richard Han Soo Cho, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 300 days.

(21) Appl. No.: 15/831,391

(22) Filed: Dec. 5, 2017

(51) Int. Cl.
  *G02B 26/08*  (2006.01)
  *G02B 27/01*  (2006.01)
  *G02B 17/00*  (2006.01)
  *F21V 8/00*   (2006.01)

(52) U.S. Cl.
  CPC ........ *G02B 26/0816* (2013.01); *G02B 6/0011* (2013.01); *G02B 17/006* (2013.01); *G02B 27/0172* (2013.01); *G02B 2027/0178* (2013.01)

(58) Field of Classification Search
  CPC .............. G02B 26/0816; G02B 6/0011; G02B 17/006; G02B 27/0172; G02B 2027/0178
  USPC ..................................................... 359/204.1
  See application file for complete search history.

(56) References Cited

U.S. PATENT DOCUMENTS

| 7,457,040 B2 | 11/2008 | Amitai |
| 7,724,441 B2 | 5/2010 | Amitai |
| 9,664,910 B2 | 5/2017 | Mansharof |
| 2013/0229717 A1 | 9/2013 | Amitai |
| 2015/0185475 A1* | 7/2015 | Saarikko ............ G02B 6/02085 382/117 |
| 2016/0085300 A1* | 3/2016 | Robbins .................. G06F 3/013 345/633 |
| 2016/0116743 A1 | 4/2016 | Amitai |
| 2017/0082858 A1 | 3/2017 | Klug et al. |

OTHER PUBLICATIONS

Robert Chappell et al., "Implementing Eye Tracking for Medical, Automotive and Headset Applications, " Eyetech Digital Systems, May 12, 2015 (https://www.slideshare.net/embeddedvision/b01-xilinx-isaacschappell, as retrieved Nov. 8, 2017).

James Darpinian, "Homebrew Oculus Rift Eye Tracker," (https://jdarpinian.blogspot.com/2014/06/homebrew-oculus-rift-eye-tracker.html, posted Jun. 10, 2014; retrieved Nov. 8, 2017).

* cited by examiner

*Primary Examiner* — Euncha P Cherry
(74) *Attorney, Agent, or Firm* — FisherBroyles, LLP (57) ABSTRACT

The disclosed apparatus may include a planar substrate including a first dimension, a second dimension perpendicular to the first dimension, and a thickness perpendicular to a plane defined by the first dimension and the second dimension. The planar substrate may include material that is transparent to at least one wavelength band of visible light and at least one wavelength band of infrared light. The apparatus may also include a plurality of reflective segments embedded in the planar substrate and distributed along the plane. The face of each reflective segment may be oblique to the plane. In addition, the reflective segments may be transparent to the wavelength band of visible light and at least partially reflective to the wavelength band of infrared light. Various other systems and methods are also disclosed.

20 Claims, 7 Drawing Sheets

APPARATUSES, SYSTEMS, AND METHODS FOR REFLECTING INFRARED LIGHT

BACKGROUND

Some modern head-mounted display systems, such as those employed in connection with virtual reality (VR) or augmented reality (AR) systems, employ eye-tracking technology in order to enhance the operation of the overall system. Eye-tracking systems often use one or more light sources to project light outside the visible spectrum (e.g., light in the infrared (IR) and/or near-infrared (NIR) spectrum) onto one or both eyes of a viewer. An imaging subsystem or device may then capture and process the projected light that is reflected by the viewer's eyes to "track" (i.e., determine where the viewer is looking) the eyes of the viewer, such as by detecting the location of the viewer's pupils, detecting the shape of the viewer's corneas, and so on. Head-mounted display systems may use eye-tracking information for a variety of reasons. For example, a VR system may, upon identifying an area of a virtual image at which the viewer is currently gazing, sharpen that area of the image while slightly blurring other areas to simulate the actual depth of field (DOF) characteristics of the human eye.

In conventional head-mounted systems with eye-tracking technology, an optical element that passes visible light but reflects IR light, sometimes referred to as a "hot mirror," may be disposed between a display device of the head-mounted display system and the eyes of the viewer at an angle relative to the display (e.g., at 45 degrees). In such systems, the optical element may allow light projected by the display device to reach the viewer's eyes while redirecting IR or NIR light reflected by the viewer's eyes to the eye-tracking subsystem, which may in turn enable the eye-tracking subsystem to be positioned outside of the viewer's field of view. Unfortunately, the size and/or relative angle of hot mirrors used in conventional head-mounted systems typically increase the distance between the viewer's eyes and the display, as well as the overall size of the system, potentially resulting in increased manufacturing and shipping costs and/or decreased comfort and other issues for end-users.

SUMMARY

As will be described in greater detail below, the instant disclosure is generally directed to improved apparatuses, systems, and methods for reflecting infrared light (e.g., IR and/or NIR light). In one example, such an apparatus may include a planar substrate including a first dimension, a second dimension perpendicular to the first dimension, and a thickness perpendicular to a plane defined by the first dimension and the second dimension. The planar substrate may include material that is transparent to at least one wavelength band of visible light and at least one wavelength band of infrared light. The apparatus may also include a plurality of reflective segments embedded in the planar substrate and distributed along the plane. The face of each reflective segment may be oblique to the plane. In addition, the reflective segments may be transparent to the wavelength band(s) of visible light and at least partially reflective to the wavelength band(s) of infrared light.

In some embodiments, each of the plurality of reflective segments may include a length aligned parallel to the first dimension and a width perpendicular to the length. In these embodiments, the plurality of reflective segments may be spaced along the second dimension and the face of each of the plurality of reflective segments may be parallel to the length and the width of the reflective segment. Additionally, adjacent ones of the plurality of reflective segments may overlap from a perspective of an axis perpendicular to the face of at least one of the plurality of reflective segments. In other embodiments, adjacent ones of the plurality of reflective segments may be spaced apart from each other from a perspective of an axis perpendicular to the face of at least one of the plurality of reflective segments.

In some examples, each of the plurality of reflective segments may be reflective to the wavelength band(s) of infrared light to a same degree.

In some embodiments, the face of each of the plurality of reflective segments may be oblique to the plane by the same angle. In other embodiments, the face of each of the plurality of reflective segments, progressing in a direction along the second dimension, may be oblique to the plane by an angle less than or equal to a preceding one of the plurality of reflective segments.

In some examples, each of the plurality of reflective segments may include a thin film, while in other embodiments, each of the plurality of reflective segments may include a holographic material. In some embodiments, the planar substrate may include glass and/or a polymer.

In at least some embodiments, the wavelength band(s) of infrared light may include a near-infrared (NIR) wavelength band.

In one example, a corresponding system may include a display that transmits at least one wavelength band of visible light along an optical axis to an eye of a viewer and a planar optical element, positioned between the display and the eye of the viewer and oriented perpendicularly to the optical axis. In this example, the planar optical element may be transparent to the wavelength band(s) of visible light incident at a first surface of the planar optical element facing the display but reflective to at least one wavelength band of infrared light incident at a second surface of the planar optical element opposite the first surface. The system may also include an imaging component that captures the wavelength band(s) of infrared light reflected by the planar optical element. In this example, the planar optical element may reflect the wavelength band(s) of infrared light at an oblique angle to the optical axis.

In some examples, the system may further include a viewing optical element, positioned on the optical axis between the planar optical element and the eye of the viewer, that focuses the wavelength band(s) of visible light transmitted from the display for the eye of the viewer.

In some embodiments, the display may include a planar surface from which the wavelength band(s) of visible light are transmitted, and the first surface of the planar optical element may include a planar surface positioned parallel to the planar surface of the display. Also, in some examples, the system may include an actuator that moves the display along the optical axis. In such examples, the actuator may also move the planar optical element with the display along the optical axis.

In some examples, the system may also include at least one light source that transmits the wavelength band(s) of infrared light toward the eye of the viewer. In these examples, the second surface of the planar optical element may receive a reflection of the wavelength band(s) of infrared light from the eye of the viewer. The system may also include a control system that processes the wavelength band(s) of infrared light captured by the imaging component to track the eye of the viewer.

In some embodiments, the planar optical element may include a planar substrate including a first dimension, a second dimension perpendicular to the first dimension, and a thickness perpendicular to a plane defined by the first dimension and the second dimension. In these embodiments, the planar substrate may include a material that is transparent to the wavelength band(s) of visible light and the wavelength band(s) of infrared light. The planar optical element may also include a plurality of reflective segments embedded in the planar substrate and distributed along the plane. In one example, the face of each of the plurality of reflective segments may be oblique to the plane. In addition, the plurality of reflective segments may be transparent to the wavelength band(s) of visible light but at least partially reflective to the wavelength band(s) of infrared light.

In another example, a method may include (1) passing, by a planar optical element, at least one wavelength band of visible light incident at a first surface of the planar optical element through a second surface of the planar optical element opposite the first surface and (2) reflecting, by a plurality of reflective segments embedded in the planar optical element and oriented obliquely to at least one of the first surface and the second surface, at least one wavelength band of infrared light incident at the second surface of the planar optical element at an oblique angle to the second surface. In some examples, the method may also include (1) transmitting, by a display, the wavelength band(s) of visible light incident at the first surface of the planar optical element and (2) capturing, at an imaging component, the wavelength band(s) of infrared light reflected by the plurality of reflective segments.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to improved apparatuses, systems, and methods for reflecting infrared light (e.g., IR and/or NIR light). As will be explained in greater detail below, some of the embodiments described herein may include a planar substrate including a first dimension, a second dimension perpendicular to the first dimension, and a thickness perpendicular to a plane defined by the first dimension and the second dimension. In these embodiments, the planar substrate may include a material that is transparent to at least one wavelength band of visible light and at least one wavelength band of infrared light. In addition, a plurality of reflective segments may be embedded in the planar substrate and distributed along the plane. In contrast to the planar substrate, the reflective segments may be transparent to the wavelength band(s) of visible light but at least partially reflective to the wavelength band(s) of infrared light. In some examples, such an apparatus may reflect infrared light at an angle to an optical axis to which the apparatus is oriented perpendicularly. As a result, use of the apparatus in a display system employing eye-tracking technology may facilitate positioning of the apparatus parallel to the display, which may in turn reduce the overall distance between the eyes of the viewer and the display, potentially resulting in decreased system weight, decreased manufacturing costs, and/or increased end-user comfort, among other benefits.

Figure 1:
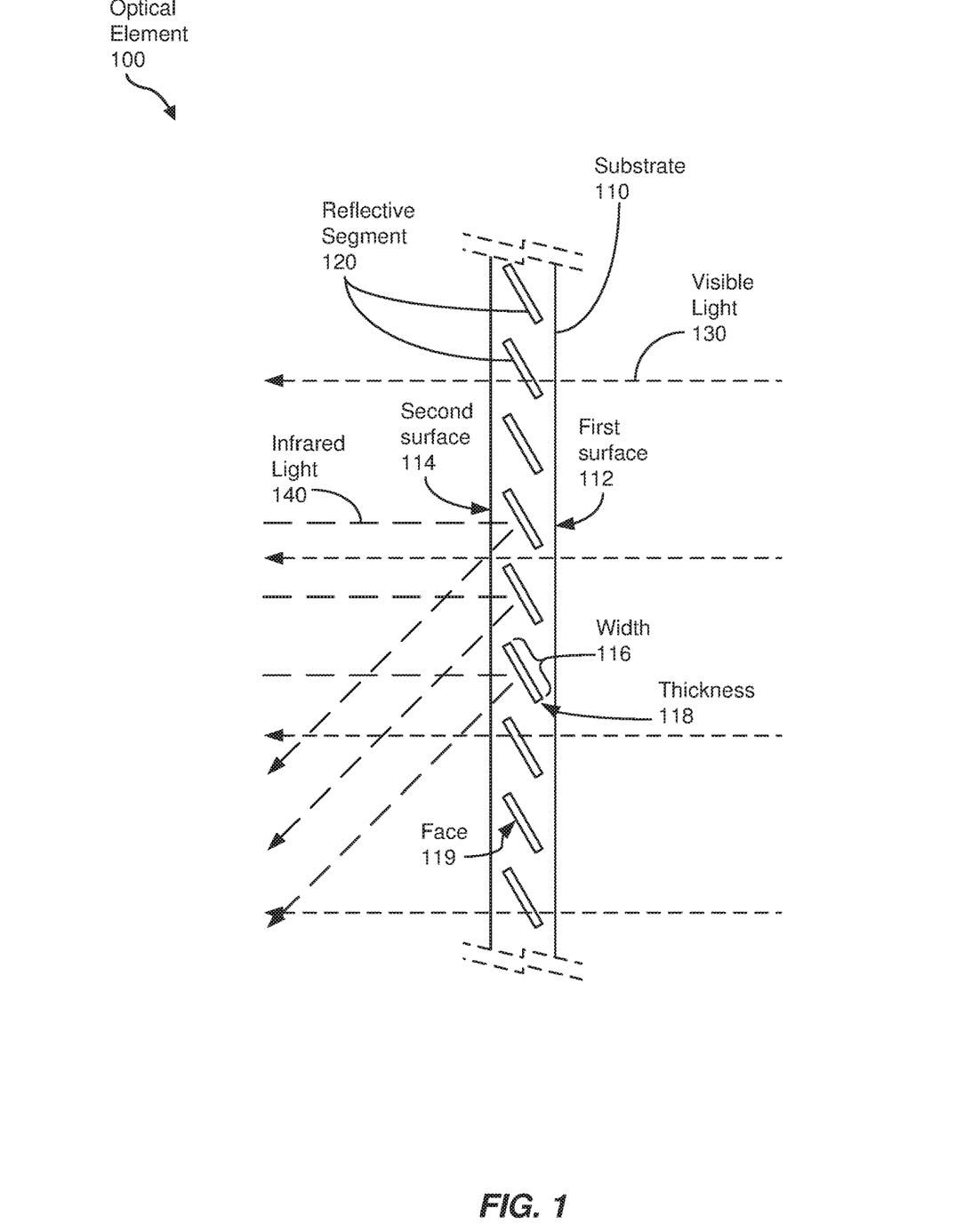
FIG. 1 is a side view of an exemplary optical element for reflecting infrared light.
Figure 2:
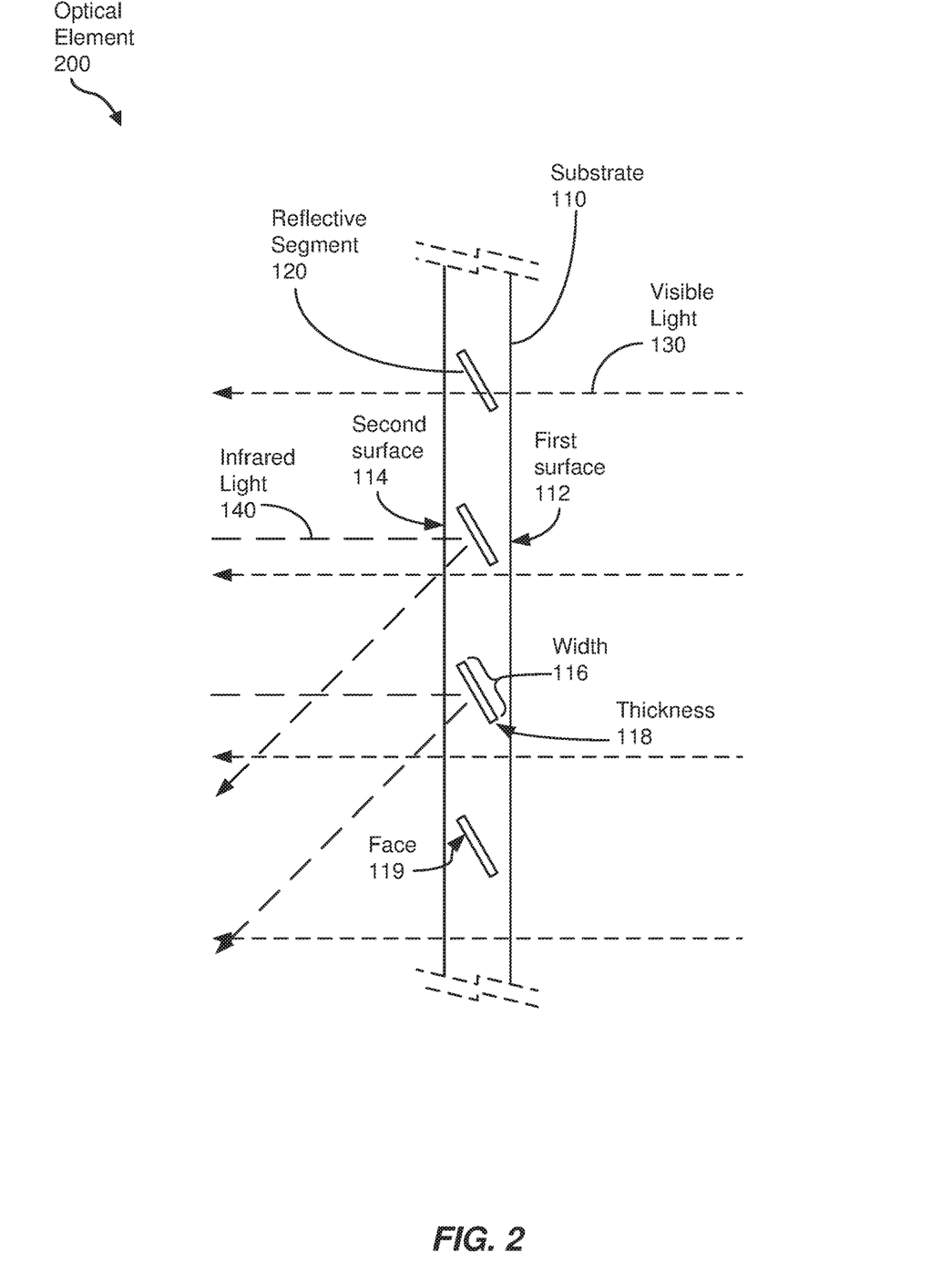
FIG. 2 is a side view of another exemplary optical element for reflecting infrared light.
Figure 3:
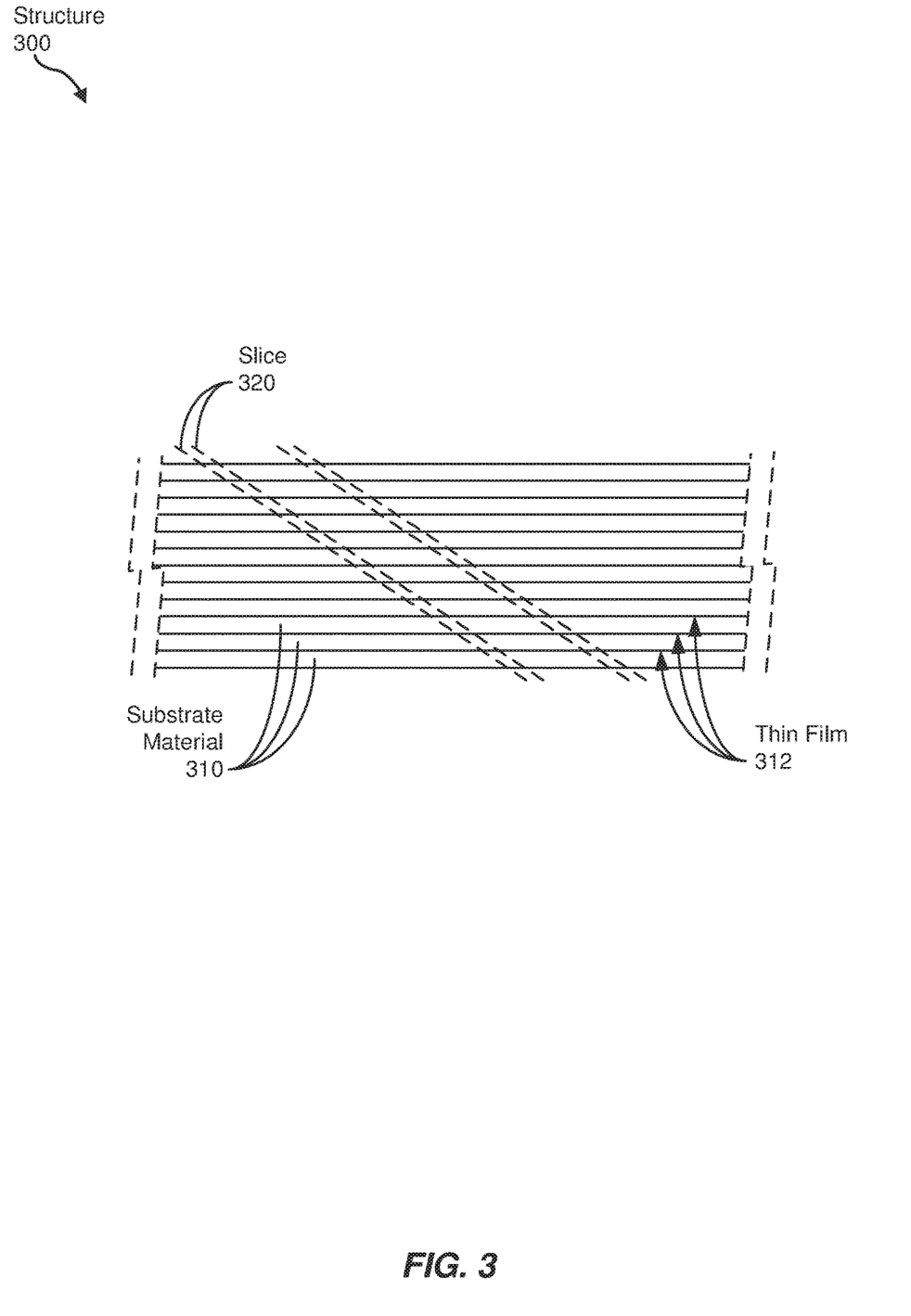
FIG. 3 is side view of an exemplary structure that may be employed in manufacturing the exemplary optical elements of FIGS. 1 and 2.
Figure 4:
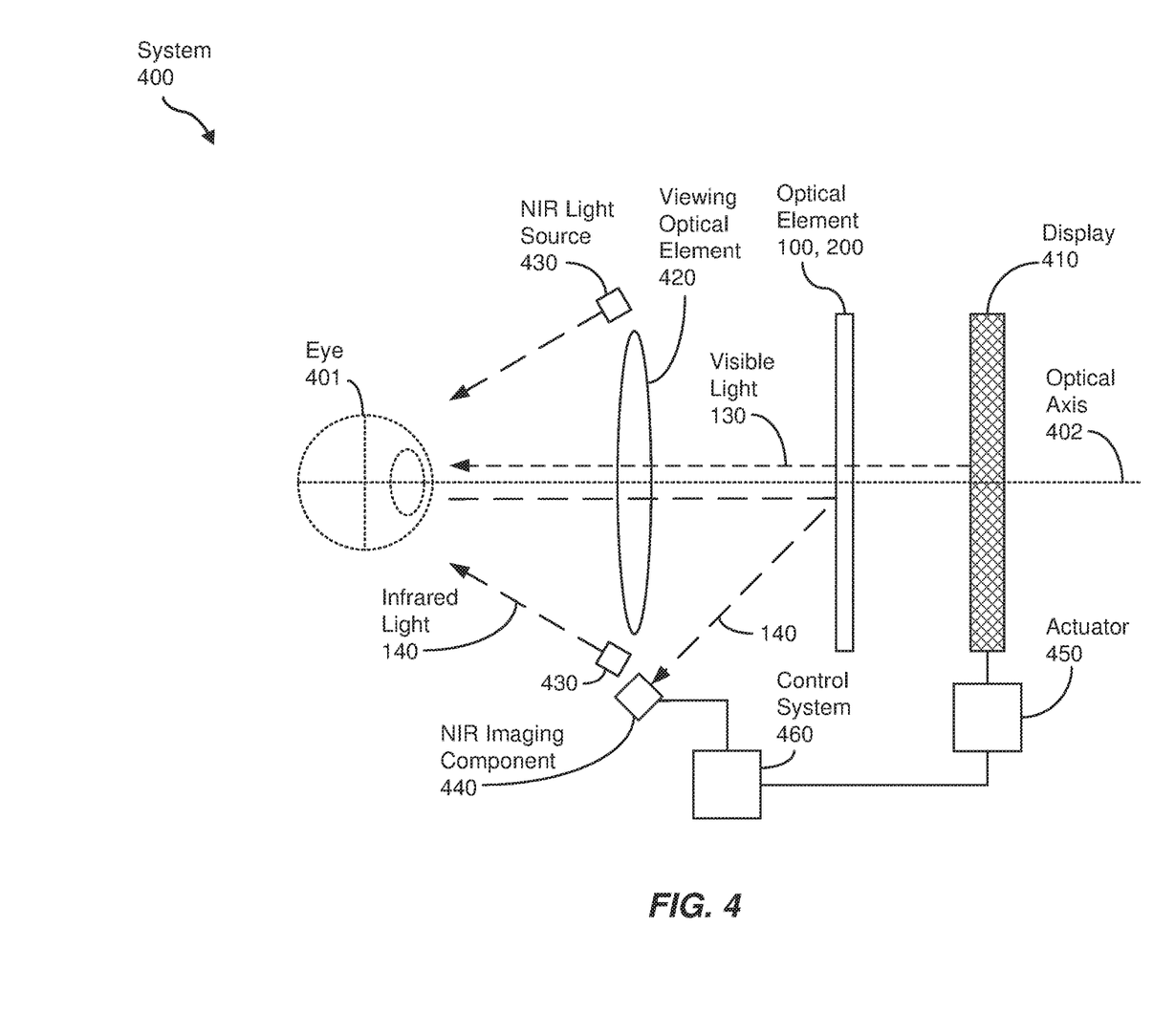
FIG. 4 is a side view of an exemplary display system including eye-tracking technology employing the exemplary optical element of FIG. 1 or FIG. 2.
Figure 5:
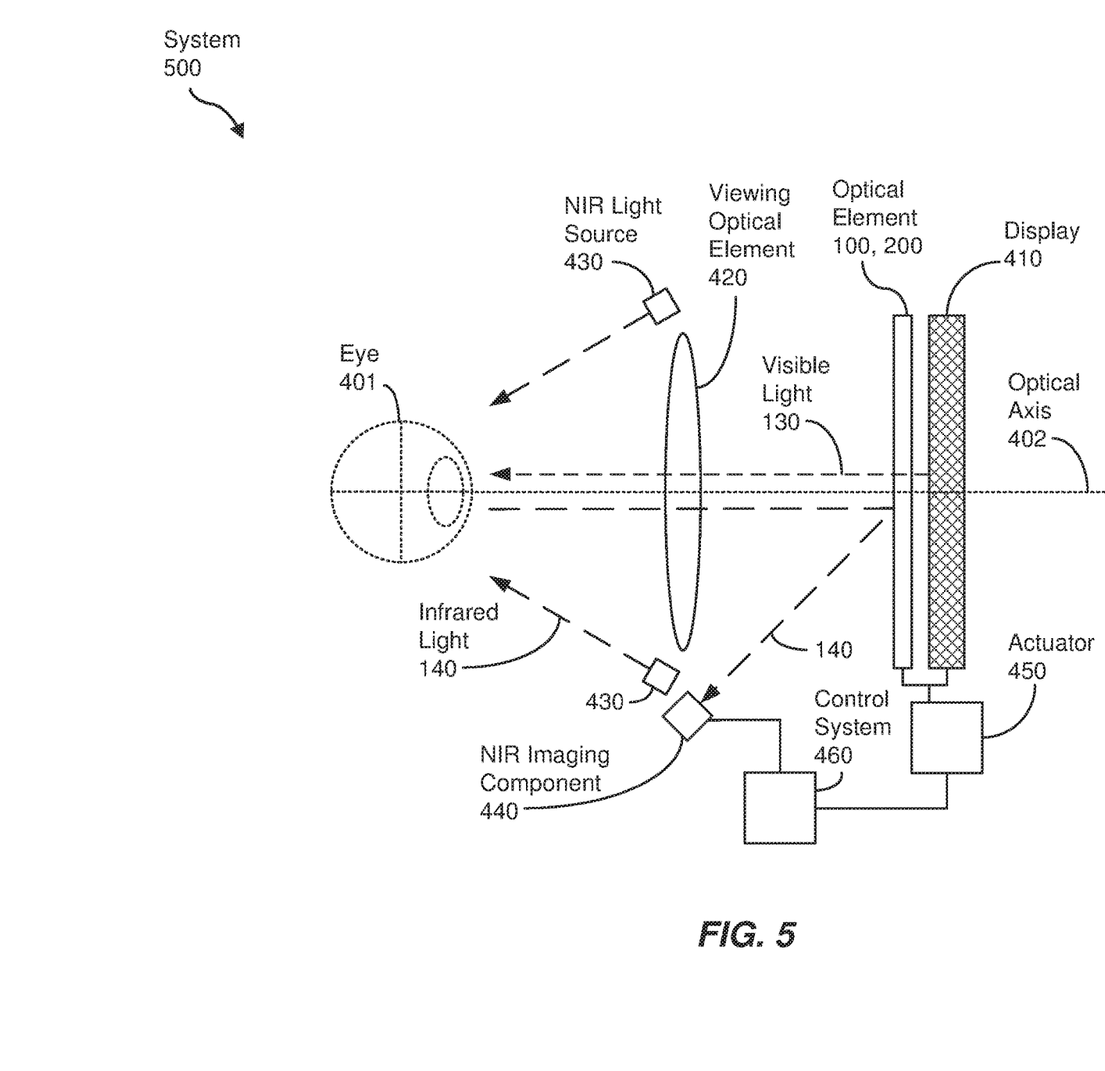
FIG. 5 is a side view of another exemplary display system including eye-tracking technology employing the exemplary optical element of FIG. 1 or FIG. 2.

The following will provide, with reference to FIGS. 1-7, detailed descriptions of exemplary apparatuses, systems, and methods for reflecting infrared light, as which may be used in conjunction with a head-mounted display or other system employing eye-tracking technology. More specifically, with respect to FIGS. 1 and 2, exemplary optical elements for reflecting infrared light are discussed. In addition, an exemplary structure employable for use in manufacturing the exemplary optical elements of FIGS. 1 and 2 is described in connection with FIG. 3. Exemplary display systems including eye-tracking technology employing the exemplary optical element of FIG. 1 or FIG. 2 are explained in conjunction with FIGS. 4 and 5. With respect to FIG. 6, an exemplary method of tracking an eye of a viewer employing the exemplary systems of FIGS. 4 and 5 is discussed. Finally, an exemplary head-mounted display that may include the exemplary system of either FIG. 4 or FIG. 5 is described in connection with FIG. 7.

FIG. 1 is a side view of an exemplary optical element 100 for reflecting infrared light. In some examples, the term "infrared light" may refer to all or some portion of one or both of the NIR wavelength band (e.g., 0.75 to 1.4 microns ($\mu$m)) and/or other portions of the IR wavelength band (e.g., 1.4 to 15 $\mu$m or greater). However, other optical wavelength bands may be reflected using the structure(s) discussed herein.

More specifically, in some examples, optical element 100 may reflect some portion of the NIR and/or IR bands at an oblique angle relative to an overall planar structure of optical element 100 while allowing at least some portion of the visible wavelength band (e.g., 0.38 to 0.78 µm) to pass therethrough. In some embodiments, optical element 100, or some portion thereof, may be biased to reflect less than an entirety of the NIR and/or IR bands to allow substantially all of the visible wavelength light to pass through. In some examples, as described below in conjunction with FIGS. 4 and 5, optical element 100 may be located on, and aligned perpendicular to, an optical axis defined by the system. In other embodiments, optical element 100 may be aligned at an oblique angle to an optical axis of the system.

As depicted in FIG. 1, optical element 100 may include a planar substrate 110 having a first surface 112 and a second surface 114 opposite first surface 112. In addition, embedded in planar substrate 110 may be a plurality of reflective segments 120. In some examples, first surface 112 and second surface 114 may be planar surfaces parallel to each other, each of which may define a first dimension and a second dimension perpendicular to the first dimension, as a well as a thickness defined by the shortest distance between first surface 112 and second surface 114. However, some deviation from a planar shape for first surface 112 and second surface 114, as well as some deviation from a parallel relationship between first surface 112 and second surface 114, may be implemented in other examples of substrate 110. Also, in some embodiments, substrate 110 may be made of glass, a polymer, and/or any other material that allows visible light 130 to enter and pass through (e.g., enter substrate at first surface 112 and pass through second surface 114 (as shown in FIG. 1), and/or vice-versa, with minimal distortion).

In some embodiments, each reflective segment 120 embedded in substrate 110 may operate as an individual "hot mirror" by reflecting substantially all of infrared light 140 while allowing visible light 130 to pass through. Also, in at least some embodiments, the reflectance characteristics of reflective segments 120 (e.g., the particular bands of infrared light being reflected, the amount or percentage of each light band being reflected, and so on) may be the same. In some examples, each reflective segment 120 may be obliquely angled relative to first surface 112 and/or second surface 114. Consequently, in some embodiments, such as those described below in connection with FIGS. 4 and 5, reflective segments 120 may be angled relative to an optical axis, such as an optical axis along which visible light 130 and/or infrared light 140 may be aligned. In some examples, all reflective segments 120 may be oriented at the same angle relative to first surface 112 and/or second surface 114 (e.g., some angle between 0 degrees and 90 degrees). In other embodiments, some reflective segments 120 may be oriented at a different angle relative to first surface 112 and/or second surface 114 compared to other reflective segments 120. For example, the angle of orientation of each reflective segment 120 relative to first surface 112 and/or second surface 114 may be less than or equal to the angle of orientation of an adjacent reflective segment 120 (e.g., a preceding reflective segment 120 while proceeding from top to bottom, as shown in FIG. 1).

In some examples, each reflective segment 120 may be substantially rectangular by having a width 116 that may be substantially less than its length (e.g., in a direction perpendicular to width 116 and first surface 112 and/or second surface 114). Also, in some embodiments, a thickness 118 of each reflective segment 120 (e.g., perpendicular to width 116) may be much less than width 116. In some examples, the length of each reflective segment 120 may extend substantially along the entirety of substrate 110. In other embodiments, multiple reflective segments 120 may be aligned end-to-end to extend substantially along the entirety of substrate 110. Other configurations of reflective segments 120 within substrate 110 may be employed in other examples.

In some embodiments, reflective segments 120 may be manufactured from one or more thin films. An example of one such embodiment is described below in conjunction with FIG. 3. In other examples, reflective segments 120 may be holographic elements or other materials capable of reflecting at least some of infrared light 140.

In some examples, such as those of FIGS. 1 and 2, reflective segments 120 may be entirely encapsulated within substrate 110. In other embodiments, width 116 of reflective segments 120 may be sufficient to cause reflective segments 120 to extend to first surface 112 and/or second surface 114.

As depicted in FIG. 1, reflective segments 120 may be spaced evenly along first surface 112 and/or second surface 114. Also, in some examples, reflective segments 120 may be spaced and angled such that they may overlap, or at least be positioned side-by-side, when viewed at an oblique angle relative to an axis perpendicular to first surface 112 and/or second surface 114 (e.g., an angle perpendicular to a face 119 of at least one reflective segment 120, or an angle parallel to a reflection of infrared light 140 from at least one reflective segment 120). In such cases, an amount of infrared light 140 reflected may be increased or maximized. In other examples, such as an optical element 200 illustrated in FIG. 2, the spacing of reflective segments 120 along first surface 112 and/or second surface 114 may be spaced apart from each other from a perspective of an oblique angle relative to an axis perpendicular to first surface 112 and/or second surface 114 (e.g., an angle perpendicular to a face 119 of at least one reflective segment 120, or an angle parallel to a reflection of infrared light 140 from at least one reflective segment 120). In such configurations, fewer reflective segments 120 may be employed to minimize potential impacts to image quality of visible light 130 passing through optical element 200 while still reflecting sufficient infrared light 140.

FIG. 3 is a side view of an exemplary structure 300 by which at least a portion of optical elements 100 and 200 of FIGS. 1 and 2 may be manufactured. In some examples, structure 300 may be a laminate constructed using multiple layers of substrate material 310 (e.g., glass, polymer, or the like for substrate 110) that are substantially planar in shape and operate to pass both visible light 130 and infrared light 140. On a surface between each layer of substrate material 310, one or more thin films 312 may be deposited. In at least some examples, thin film 312 may operate as a hot mirror to pass visible light 130 and to reflect infrared light 140 (see FIGS. 1 and 2). Thereafter, by cutting structure 300 at an angle relative to layers of structure 300 (e.g., as shown in FIG. 3 at slices 320, which may be cut along planes parallel to each other), at least a portion of optical element 100 or 200 may be produced, as multiple reflected segments 120 (e.g., each made from thin film 312) are spaced apart between layers of substrate material 310 serving as substrate 110. Additionally, slices 320 may generate surfaces that may become, or are parallel to, first surface 112 and second surface 114 of optical elements 100 and 200. As depicted in FIG. 3, multiple optical elements 100 or 200 may be produced from a single multilayer structure 300. Various aspects of structure 300 (e.g., the thickness of each layer of substrate material 310, the angle relative to the layers of structure 300 at which slices 320 are taken, the distance between slices 320, and so on) may determine various properties discussed above regarding optical elements 100 and 200 (e.g., the angle of reflective segments 120 relative to first surface 112 and/or second surface 114, the distance between each reflective segment 120, and the like).

In some embodiments, after the cutting at slices 320, the resulting structure may either serve as optical element 100 or 200 (e.g., in which the reflective segments 120 extend to both first surface 112 and second surface 114 of substrate 110), or may be further processed. For example, an encapsulating or laminating material (e.g., the same or similar material as substrate material 310) may be formed on one or both resulting planar surfaces corresponding to slices 320 to ensure reflective segments 120 are fully embedded within substrate 110 of optical elements 100 and 200, as shown in FIGS. 1 and 2. In some examples, such encapsulation layers may be of a comparatively high-transparency material relative to substrate material 310, providing for less distortion of visible light 130 passing through optical element 100 or 200.

FIG. 4 is a side view of an exemplary display system 400 that may include eye-tracking technology employing optical element 100 or 200 of FIGS. 1 and 2. As depicted in FIG. 4, system 400 may include a display 410 that provides an image to be seen by a viewer (e.g., by way of an eye 401 of the viewer). In some examples, a viewing optical element 420 (e.g., a viewing lens) may be positioned along an optical axis 402 between display 410 and eye 401 to facilitate viewing of the image from display 410 at a comparatively close distance between eye 401 and display 410 while also providing an expanded field of view (FOV) for the viewer. Moreover, appropriate focus for eye 401 may be provided by movement of display 410 along optical axis 402 (e.g., using an actuator 450 controlled by a control system 460). In some examples, control system 460 may include a microprocessor, microcontroller, and/or other hardware processor that may execute programming code to perform at least some of the operations ascribed to system 400. Additionally or alternatively, control system 460 may use another actuator (not shown in FIG. 4) to move viewing optical element 420 to provide proper focus of display 410 for eye 401.

In some embodiments, system 400 may include components that facilitate tracking of eye 401 (e.g., determining a location to which eye 401 is directed, determining a particular direction to which eye 401 is rotating, etc.) to enhance the operation of system 400. For example, tracking eye 401 may allow system 400 to alter or enhance a particular area on display 410 to which eye 401 is directed, to interpret particular eye 401 movements as input to system 400, and so on. In this example, eye-tracking functionality may be facilitated using one or more NIR light sources 430, an optical element for reflecting infrared light 140 (e.g., optical element 100 or 200), and NIR imaging component 440. While the following discussion presumes the use of NIR as infrared light 140, other wavelength bands of light (e.g., other IR wavelength bands) may be employed in other embodiments.

One or more NIR light sources 430 may be generally directed toward a surface of eye 401 to illuminate surface and/or internal features of eye 401 without affecting the ability of eye 401 to receive visible light 130 from display 410. NIR light sources 430 may be one or more NIR light-emitting diodes (LEDs), but other types of sources that generate infrared light 140 may be employed in other examples. As depicted in FIG. 4, NIR light sources 430 may be positioned about an edge of viewing optical element 420 (e.g., possibly biased toward the side of viewing optical element 420 closest to eye 401) to provide the most effective angle for illuminating eye 401 without blocking or otherwise interfering with visible light 130 along optical axis 402 between display 410 and eye 401. While two NIR light sources 430 are explicitly shown in FIG. 4, greater or fewer numbers of NIR light sources 430 may be employed in other examples.

NIR imaging component 440 may be an NIR camera or other imaging device that may capture images of infrared light 140 reflected from eye 401, which may be subsequently reflected by optical element 100 or 200 toward NIR imaging component 440. NIR imaging component 440 may forward the captured images to control system 460, which may process the images to track eye 401. In some examples, NIR imaging component 440 may be located near an edge of viewing optical element 420 to facilitate a more acute angle of reflection for infrared light 140.

In some embodiments, infrared light 140 may be reflected from eye 401 through viewing optical element 420 substantially along optical axis 402, and may be incident perpendicularly or substantially perpendicularly to optical element 100 or 200 (e.g., at second surface 114 thereof). Also, in some examples, the angle of reflection relative to first surface 112 and/or second surface 114 of optical element 100 or 200 (or, alternatively, relative to optical axis 402) may be at least partially dependent upon the angle of reflective segments 120 relative to first surface 112 and/or second surface 114, as described above. Other factors, such as differences in the index of refraction at the various material interfaces at optical element 100 or 200 (e.g., an interface between air and substrate 110, an interface between substrate 110 and reflective segment 120, and the like), may also influence the angle of reflection of infrared light 140 at optical element 100 or 200.

In exemplary embodiments of FIG. 4, optical element 100 or 200 may remain stationary along optical axis 402, thus maintaining a constant distance from NIR imaging component 440 as well. Consequently, in some examples, reflective segments 120 may be oriented at the same oblique angle relative to first surface 112 and/or second surface 114 of optical element 100 or 200 to reflect light toward NIR imaging component 440, regardless of the position of viewing optical element 420 or display 410 along optical axis 402.

FIG. 5 is a side view of another exemplary display system 500 that may include eye-tracking technology employing optical element 100 or 200 of FIGS. 1 and 2. As in system 400 of FIG. 4, system 500 may include display 410 for providing images of visible light 130 to eye 401 of the viewer by way of viewing optical element 420. Moreover, system 500 may include one or more NIR light sources 430, NIR imaging component 440, and intervening optical element 100 or 200 for reflecting infrared light 140 received from eye 401 toward NIR imaging component 440, which captures images of reflected infrared light 140, as described above. Control system 460 may process those images to track eye 401, also as discussed earlier.

In exemplary embodiments of system 500, as shown in FIG. 5, actuator 450 may translate display 410 and optical element 100 or 200 together to alter the distance between eye 401 and display 410, such as for focusing or other purposes. In some examples, such a design may allow optical element 100 or 200 to remain close to (e.g., adjacent to) a front surface of display 410, thus possibly allowing an overall shorter length of system 500 along optical axis 402 compared to system 400. In some embodiments in which display 410 and optical element 100 or 200 are in close proximity, optical element 100 or 200 may be close to the focus point represented by the front surface of display 410.

Consequently, the reflective and/or transmissive characteristics of substrate 110 and/or reflective segments 120 of optical element 100 or 200 may be biased toward the spectrum of visible light 130 in such examples so that any possible negative effect of reflective segments 120 on the image quality of visible light 130 being provided to eye 401 may be mitigated. Additionally, in some examples, encapsulation that may be employed on first surface 112 and/or second surface 114 of optical element 100 or 200, as described above in conjunction with FIG. 3, may employ an exceptionally clear, non-distortive material to further improve the transmissive qualities of optical element 100 or 200.

In addition, in exemplary systems 500 in which actuator 450 moves optical element 100 or 200, the reflection of infrared light 140 toward NIR imaging component 440 may be incorrectly aligned at times, thus possibly negatively affecting the eye-tracking capability of system 500. In some examples, to improve the images being captured by NIR imaging component 440, actuator 450 or a separate actuator (not shown in FIG. 5) may translate and/or rotate NIR imaging component 440 to align NIR imaging component 440 correctly with infrared light 140 being reflected by optical element 100 or 200. For example, as display 410 and optical element 100 or 200 translate away from eye 401, NIR imaging component 440 may be rotated toward the newer position of optical element 100 or 200. In other embodiments, optical element 100 or 200 may be configured such that the angle at which at least some of reflective segments 120 relative to first surface 112 and/or second surface 114 (e.g., relative to optical axis 402) may vary across optical element 100 or 200 so that the point of view of NIR imaging component 440 relative to infrared light 140 reflected by optical element 100 or 200 may remain at least relatively stable.

While systems 400 and 500 may orient display 410, viewing optical element 420, and optical element 100 or 200 perpendicularly to optical axis, other embodiments of systems 400 and 500 may employ a canted system in which display 410, viewing optical element 420, and/or optical element 100 or 200 are oriented at an oblique angle to optical axis 402. In some examples, such a canted system may allow reflective segments 120 of optical element 100 or 200 to be oriented at less of an angle relative to first surface 112 and/or second surface 114 compared to optical element 100 or 200 of systems 400 and 500.

Figure 6:
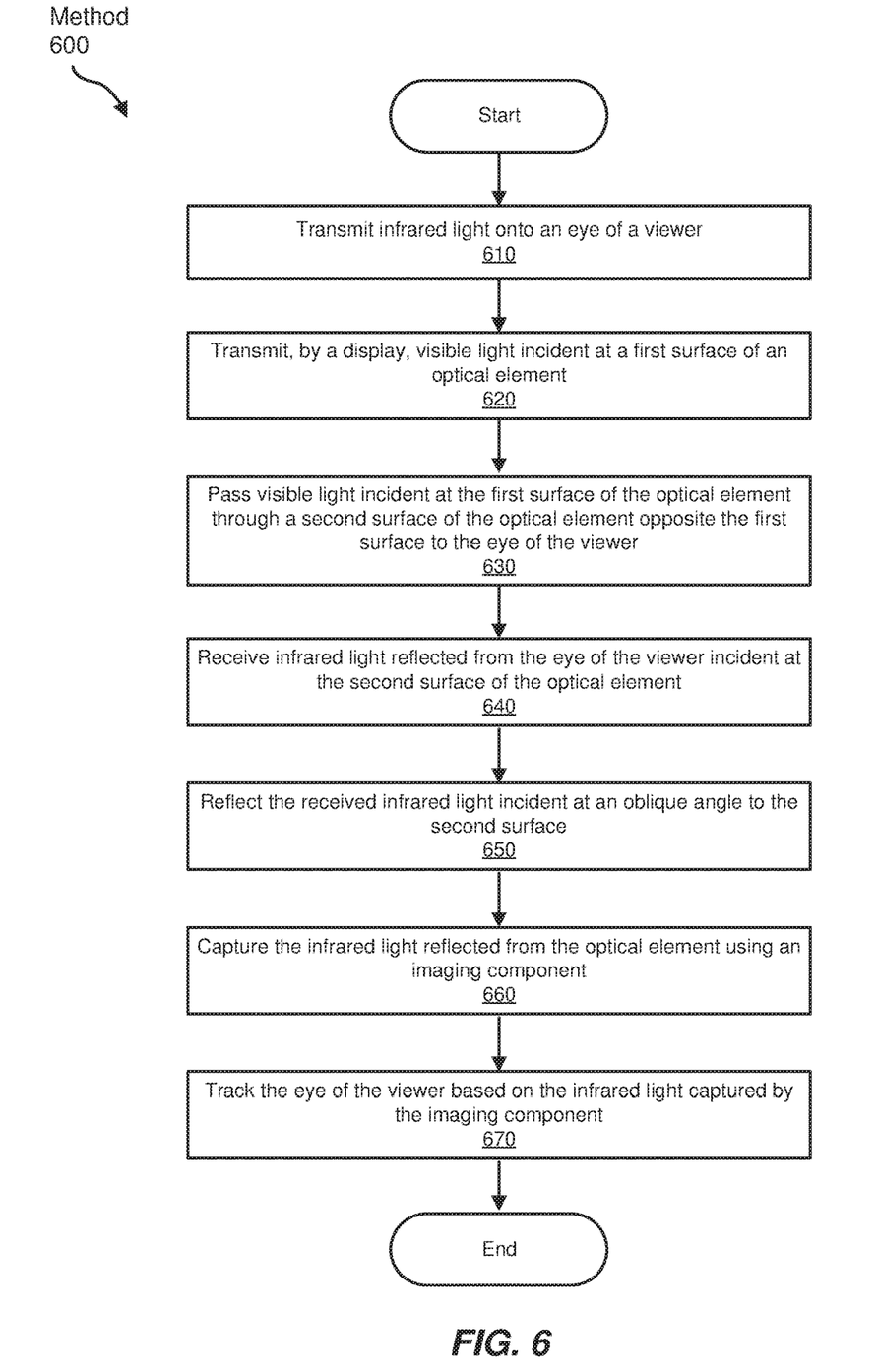
FIG. 6 is a flow diagram of an exemplary method of tracking an eye of a viewer employing the exemplary systems of FIGS. 4 and 5.

FIG. 6 is a flow diagram of an exemplary method 600 of tracking an eye (e.g., eye 401) of a viewer employing an exemplary viewing system (e.g., system 400 or 500 of FIGS. 4 and 5). While method 600 employs optical element 100 or 200 to perform some of the operational steps associated with method 600, other optical elements aside from optical elements 100 and 200 may be employed in other embodiments.

In method 600, at step 610, infrared light (e.g., infrared light 140, such as NIR and/or IR light) may be transmitted (e.g., by NIR light source 430) onto an eye of a viewer. At step 620, a display (e.g., display 410) may transmit visible light incident at a first surface (e.g., surface 112) of an optical element (e.g., optical element 100 or 200). In at least some examples, the optical element may be positioned between the display and the eye of the viewer. At step 630, the optical element may pass the visible light that is incident at the first surface through a second surface (e.g., second surface 114) opposite the first surface to the eye of the viewer. At step 640, infrared light reflected from the eye of the viewer may be received at the second surface of the optical element. At step 650, the infrared light received from the eye of the viewer may be reflected at an oblique angle relative to the second surface of the optical element. As described above, in some examples, the reflection of the infrared light may be performed by multiple reflective segments (e.g., reflective segments 120) embedded in a substrate (e.g., substrate 110) of the optical element and oriented at an oblique angle to a plane defined by the optical element (e.g., the first surface and/or the second surface of the optical element).

At step 660, the infrared light reflected by the optical element may be captured using an imaging component (e.g., NIR imaging component 440). At step 670, the eye of the viewer may be tracked based on the infrared light captured by the imaging component, such as by way of a control system (e.g., control system 460). In some examples, the control system may be a microprocessor, microcontroller, and/or other hardware processor that executes program instructions to communicate with the imaging component, as well as the infrared light sources, display, and/or other components, to capture images of the infrared light reflected by the optical element, and then to process those images to determine a current orientation and/or movement of the eye, as discussed above.

Figure 7:
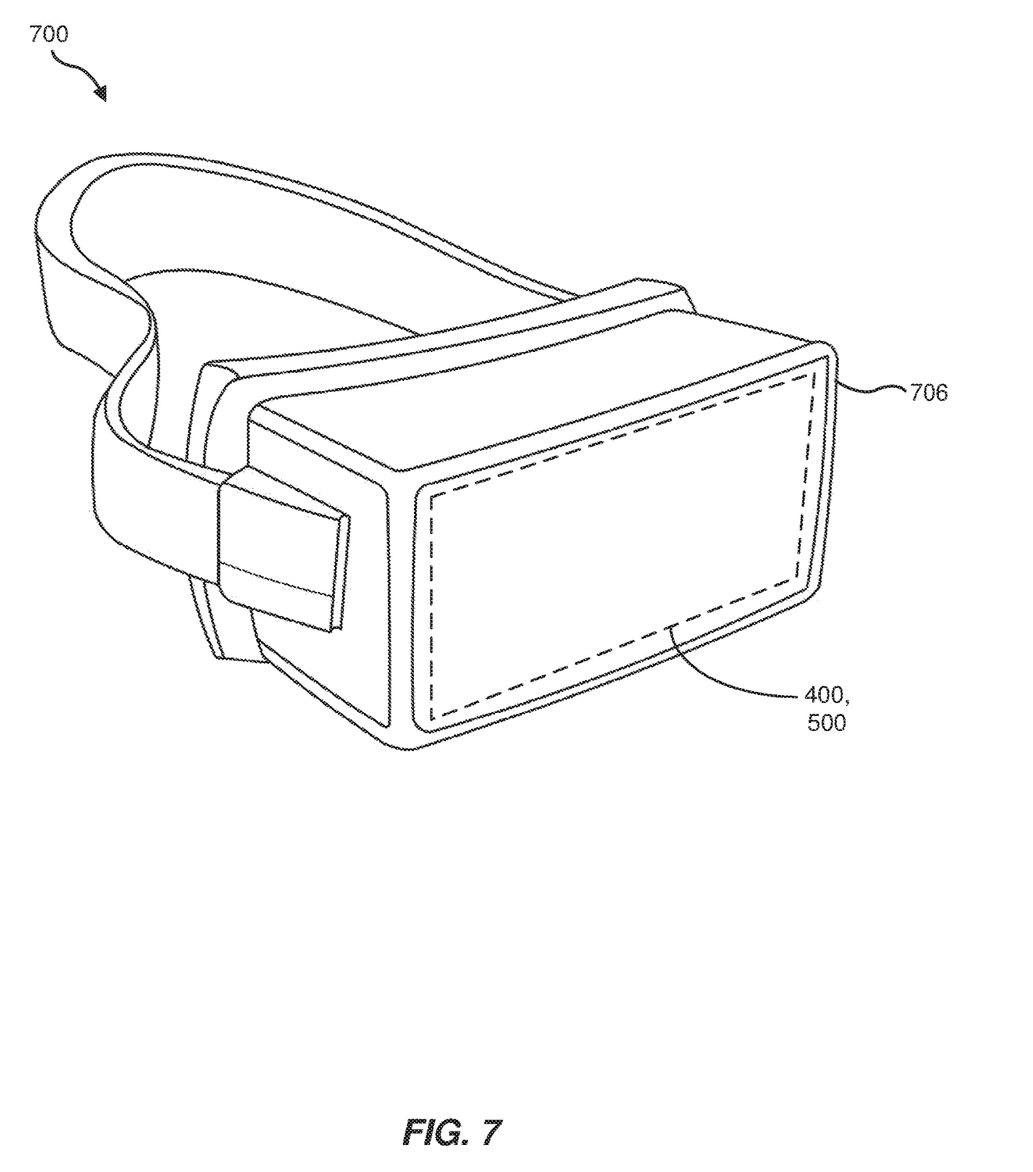
FIG. 7 is a perspective view of an exemplary head-mounted display that may include the exemplary system of FIG. 4 or FIG. 5.

FIG. 7 is a perspective view of an exemplary head-mounted display 700 that may include display system 400 or 500 of FIGS. 4 and 5. As shown in FIG. 7, head-mounted display 700 may include a front rigid body 706 that houses system 400 or 500 to display a series of images to a viewer wearing head-mounted display 700. In some examples, display system 400 or 500 (or other embodiments of the instant disclosure) may be implemented as part of head-mounted display 700 in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As discussed throughout the instant disclosure, the disclosed system and methods may provide an optical element that, at least in some examples, may be oriented substantially parallel to a display that presents visible light to a viewer while reflecting infrared light received from one or more eyes of the viewer obliquely to an infrared imaging component for eye-tracking purposes. Consequently, by allowing the optical element to be aligned parallel to the display, the overall length of the display system (e.g., from the eye(s) of the viewer to the display) may be comparatively shorter than more conventional display systems (e.g., head-mounted displays) that provide eye-tracking capability, thus enhancing the use of such a system. Moreover, due at least in part to this shortened distance, less movement of a viewing optical element (e.g., a viewing lens) or the display along the optical axis of the system may be necessary, thus allowing the infrared imaging component being employed for eye-tracking to be placed closer to the viewing optical element. Enabling closer placement of the infrared imaging component to the viewing optical element may allow a more acute angle of reflection of the infrared light reflected from the eye of the viewer, facilitating a better point of view from which to track the eye.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a planar substrate comprising a first dimension, a second dimension perpendicular to the first dimension, and a thickness perpendicular to a plane defined by the first dimension and the second dimension, wherein the planar substrate comprises a material that is transparent to at least one wavelength band of visible light and at least one wavelength band of infrared light; and
   a plurality of reflective segments embedded in the planar substrate and distributed along the plane, wherein a face of each of the plurality of reflective segments is oblique to the plane, and wherein the plurality of reflective segments are transparent to the at least one wavelength band of visible light and at least partially reflective to the at least one wavelength band of infrared light.

2. The apparatus of claim 1, wherein each of the plurality of reflective segments comprises a length aligned parallel to the first dimension and a width perpendicular to the length, the plurality of reflective segments are spaced along the second dimension, and the face of each of the plurality of reflective segments is parallel to the length and the width of the reflective segment.

3. The apparatus of claim 2, wherein adjacent ones of the plurality of reflective segments overlap from a perspective of an axis perpendicular to the face of at least one of the plurality of reflective segments.

4. The apparatus of claim 2, wherein adjacent ones of the plurality of reflective segments are spaced apart from each other from a perspective of an axis perpendicular to the face of at least one of the plurality of reflective segments.

5. The apparatus of claim 1, wherein each of the plurality of reflective segments is reflective to the at least one wavelength band of infrared light to a same degree.

6. The apparatus of claim 1, wherein the face of each of the plurality of reflective segments is oblique to the plane by a same angle.

7. The apparatus of claim 1, wherein the face of each of the plurality of reflective segments, progressing in a direction along the second dimension, is oblique to the plane by an angle less than or equal to a preceding one of the plurality of reflective segments.

8. The apparatus of claim 1, wherein each of the plurality of reflective segments comprises a thin film.

9. The apparatus of claim 1, wherein each of the plurality of reflective segments comprises a holographic material.

10. The apparatus of claim 1, wherein the planar substrate comprises at least one of:
    glass; or
    a polymer.

11. The apparatus of claim 1, wherein the at least one wavelength band of infrared light comprises a near-infrared (NIR) wavelength band.

12. A system comprising:
    a display that transmits at least one wavelength band of visible light along an optical axis to an eye of a viewer;
    a planar optical element, positioned between the display and the eye of the viewer and oriented perpendicularly to the optical axis, that is transparent to the at least one wavelength band of visible light incident at a first surface of the planar optical element facing the display and is reflective to at least one wavelength band of infrared light incident at a second surface of the planar optical element opposite the first surface, wherein the planar optical element reflects the at least one wavelength band of infrared light at an oblique angle to the optical axis; and
    an imaging component that captures the at least one wavelength band of infrared light reflected by the planar optical element.

13. The system of claim 12, further comprising a viewing optical element, positioned on the optical axis between the planar optical element and the eye of the viewer, that focuses the at least one wavelength band of visible light transmitted from the display for the eye of the viewer.

14. The system of claim 12, wherein:
    the display comprises a planar surface from which the at least one wavelength band of visible light is transmitted; and
    the first surface of the planar optical element comprises a planar surface positioned parallel to the planar surface of the display.

15. The system of claim 14, further comprising an actuator that moves the display along the optical axis.

16. The system of claim 15, wherein the actuator further moves the planar optical element with the display along the optical axis.

17. The system of claim 12, further comprising:
    at least one light source that transmits the at least one wavelength band of infrared light toward the eye of the viewer, wherein the second surface of the planar optical element receives a reflection of the at least one wavelength band of infrared light from the eye of the viewer; and a control system that processes the at least one wavelength band of infrared light captured by the imaging component to track the eye of the viewer.

18. The system of claim 12, wherein the planar optical element comprises:

a planar substrate comprising a first dimension, a second dimension perpendicular to the first dimension, and a thickness perpendicular to a plane defined by the first dimension and the second dimension, and wherein the planar substrate comprises a material that is transparent to the at least one wavelength band of visible light and the at least one wavelength band of infrared light; and a plurality of reflective segments embedded in the planar substrate and distributed along the plane, wherein a face of each of the plurality of reflective segments is oblique to the plane, and wherein the plurality of reflective segments are transparent to the at least one wavelength band of visible light and at least partially reflective to the at least one wavelength band of infrared light.

19. A method comprising:

passing, by a planar optical element, at least one wavelength band of visible light incident at a first surface of the planar optical element through a second surface of the planar optical element opposite the first surface; and reflecting, by a plurality of reflective segments embedded in the planar optical element and oriented obliquely to at least one of the first surface and the second surface, at least one wavelength band of infrared light incident at the second surface of the planar optical element at an oblique angle to the second surface.

20. The method of claim 19, further comprising:

transmitting, by a display, the at least one wavelength band of visible light incident at the first surface of the planar optical element; and capturing, at an imaging component, the at least one wavelength band of infrared light reflected by the plurality of reflective segments.

* * * * *